(12) United States Patent
Miszczyk et al.

(10) Patent No.: US 7,844,633 B2
(45) Date of Patent: Nov. 30, 2010

(54) SYSTEM AND METHOD FOR STORAGE, MANAGEMENT AND AUTOMATIC INDEXING OF STRUCTURED DOCUMENTS

(75) Inventors: Jaroslaw Miszczyk, Rochester, MN (US); Brent J. Baude, Rochester, MN (US); Gottfried Schimunek, Rochester, MN (US); Robert A. Bittner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 11/855,011

(22) Filed: Sep. 13, 2007

(65) Prior Publication Data

US 2009/0077009 A1 Mar. 19, 2009

(51) Int. Cl.
*G06F 7/00* (2006.01)
*G06F 17/30* (2006.01)
*G06F 15/16* (2006.01)

(52) U.S. Cl. ..................... 707/797; 707/791
(58) Field of Classification Search ............. 707/1, 707/2, 100, 999.003; 715/215–234; 717/116–137
See application file for complete search history.

(56) References Cited

U.S. PATENT DOCUMENTS

| | | | |
|---|---|---|---|
| 5,706,495 A | 1/1998 | Chadha et al. | |
| 6,105,022 A * | 8/2000 | Takahashi et al. | 1/1 |
| 6,377,946 B1 | 4/2002 | Okamoto et al. | |
| 6,434,551 B1 * | 8/2002 | Takahashi et al. | 1/1 |
| 7,051,016 B2 * | 5/2006 | Winkler | 1/1 |
| 7,069,518 B2 * | 6/2006 | Card et al. | 715/776 |
| 7,076,728 B2 | 7/2006 | Davis et al. | |
| 7,130,867 B2 | 10/2006 | Luke | |
| 7,162,482 B1 * | 1/2007 | Dunning | 707/737 |
| 7,174,327 B2 | 2/2007 | Chau et al. | |
| 7,188,332 B2 * | 3/2007 | Charisius et al. | 717/104 |
| 7,194,450 B2 | 3/2007 | Roux et al. | |
| 7,574,433 B2 * | 8/2009 | Engel | 1/1 |
| 7,711,726 B2 * | 5/2010 | Iijima et al. | 707/711 |
| 7,720,852 B2 * | 5/2010 | Dunning | 707/750 |
| 7,730,069 B2 * | 6/2010 | Yamamoto et al. | 707/741 |
| 2002/0147707 A1 | 10/2002 | Kraay et al. | |
| 2003/0014397 A1 | 1/2003 | Chau et al. | |
| 2004/0163041 A1 | 8/2004 | Engel | |
| 2005/0021542 A1 * | 1/2005 | Irle et al. | 707/100 |

* cited by examiner

*Primary Examiner*—Cam Y Truong
*Assistant Examiner*—Cecile Vo
(74) *Attorney, Agent, or Firm*—Walter W. Duft (57) ABSTRACT

A structured document storage and management technique utilizes a generic document model tree, a symbol conversion module and an encoded vector set to store structured documents. The generic document model tree represents a structured document model and contains one or more structured document nodes without storing node data unique to any particular structured document. The symbol conversion module contains untagged data associated with the one or more structured document nodes, and representing node data for particular structured documents. The symbol conversion module also maintains a value code in association with each untagged data element. The encoded vector set includes one or more encoded vectors corresponding to the one or more structured document nodes having associated untagged data. Each encoded vector contains one of the value codes at an index position that corresponds to a particular structured document. The disclosed technique allows structured documents to be efficiently stored, organized, and searched.

20 Claims, 9 Drawing Sheets

SYSTEM AND METHOD FOR STORAGE, MANAGEMENT AND AUTOMATIC INDEXING OF STRUCTURED DOCUMENTS

BACKGROUND OF THE INVENTION

1. Field of the Invention

The present invention is directed to the storage, management and indexing of structured documents, such as documents written in XML (eXtensible Markup Language) format.

2. Description of the Prior Art

By way of background, large-volume transaction-oriented enterprises, such as financial institutions, wholesale distributors, and retail chains often store the large quantities of data in a structured document format, such as XML. A typical structured document organizes the document's data elements and attributes as a set of nodes that are logically ordered in a hierarchical tree structure. Maintaining documents in this way contributes to their portability and ease of use.

Structured documents can be made accessible to an enterprise by associating them within database operations. However, with large volumes of transactions, using databases to work with structured document data presents challenges for performance, scalability, and simplicity. In particular, no existing single solution or implementation addresses two major issues associated with structured document processing, namely, (1) how to efficiently store voluminous structured documents, and (2) how to achieve fast access to arbitrarily selected parts of the structured document hierarchy, such as a node or sets of nodes within a document.

One category of existing system used for XML document storage and management system relies on XML-to-relational mapping. In this case, XML documents are shredded (disassembled) into a set of relational tables managed by a traditional RDBMS (Relational DataBase Management System). Some disadvantages of this approach include:

- XML-to-relational mapping is a complex task. It is difficult to represent XML document hierarchy in the relational database model because the two models are very different.
- Often, the original document needs to be transformed, typically through XSLT (eXtensible Style Sheet Transformations) to inject artificial keys that are then used by the RDBMS to preserve the one-to-one and one-to-many relationships among the document's various nodes. This transformation processes is resource intensive and it changes the structure of the original document. Recreating the original document requires a reverse process that removes the injected nodes.
- Disassembly of complex documents may require dozens or even hundreds of relational tables connected by complex referential integrity (RI) rules.
- Once shredded, an XML document cannot be easily reassembled.

Another category of existing XML document storage and management system stores XML documents in an internal parsed format. There are hybrid (XML/relational) databases as well as native XML databases that implement this approach. In order to facilitate fast access, these systems offer indexing capabilities. Typically, an index is created over one specific XPath (XML Path language) expression that selects just a small subset of nodes in the document. All other nodes are not indexed and thus sequential access is required. Some of the disadvantages of solutions that exist in this area include:

- Parsed XML structures may have a large footprint. The text nodes are stored within the document. Each instance of a document is represented by a separate (typically a DOM (Document Object Model)-like structure. Often, the XML documents are stored in a designated column in a table.
- Data modification (insert/delete/update) of existing documents is difficult and very resource intensive because the complex internal representation needs to be modified for each document. Potentially there may be millions of such documents stored in the database.
- Indexes are built over parts of documents. The index structure is separate from the structure where the document is stored, so that redundant data is stored and maintained. Tuning the database performance requires that multiple indexes be built over the same document. Maintaining these indexes is costly in terms of system resources. This technique is also not well suited for systems with ad hoc queries that may involve nodes for which no indexes exist.

Accordingly, a need exists for an improved technique for the storage, management and indexing of structured documents. What is required is a solution that allows structured documents to be stored, organized, and searched using minimal storage and processing resources while providing superior query response performance.

SUMMARY OF THE INVENTION

The foregoing problems are solved and an advance in the art is obtained by a method, system and computer program product for implementing a structured document storage and management system. A generic document model tree contains represents a structured document model. It contains one or more structured document nodes without storing node data unique to any particular structured document. A symbol conversion module contains untagged data associated with the one or more structured document nodes (e.g., text nodes and attribute nodes). The untagged data represents node data for one or more particular structured documents that conform to the structured document model. The symbol conversion module also maintains a value codes in association with each element of the untagged data. An encoded vector set comprises a set of encoded vectors corresponding to the one or more structured document nodes having associated untagged data. Each of the encoded vectors contains one of the value codes at an index position that corresponds to a particular structured document.

The one or more structured document nodes having associated untagged data may be linked to a corresponding one of the encoded vectors. Maintenance logic may be provided to maintain the generic document module tree, the symbol conversion module and the encoded vector set. Update logic may be provided to handle document additions, document deletions, and document edits. Search logic may be provided to handle search requests for documents whose structure is defined by the generic document object model tree. Document retrieval logic may be provided to recreate an entire structured document using the generic document model tree, the encoded vector set and the symbol conversion module.

BRIEF DESCRIPTION OF THE DRAWINGS

The foregoing and other features and advantages of the invention will be apparent from the following more particular description of exemplary embodiments, as illustrated in the accompanying Drawings, in which.

DETAILED DESCRIPTION OF EXEMPLARY EMBODIMENTS

Introduction

Exemplary embodiments of a structured document storage and management system and method will now be described whereby structured documents, such as XML files, are decomposed into a terse data structure that combines data storage and management functions with implicit (automatic) indexing. The terse data format can be used to store any number of structured documents and to provide an automatic index that facilitates rapid data access to arbitrarily selected parts of the structured documents. A number of methods are provided to efficiently navigate the structured documents in order to perform search, insert, update, and delete operations. The structured document data includes a generic document model tree (GDMT) representing the hierarchy of nodes in a set of decomposed documents. A symbol conversion module (SCM) contains untagged data and assigned codes for nodes of the generic document model tree having associated data values. An encoded vector set (EVS) comprises encoded vectors that each contain the codes representing untagged data for a given node and which therefore constitute an index over that particular node.

There are a number of advantages of the disclosed solution, including:

Both data and index information are represented in the encoded vector set. There is no data duplication.

All data entities (untagged data) are automatically indexed.

The untagged data is converted to concise codes so that the encoded vector set has a small footprint as compared to current solutions.

Data modification is very efficient. The system manipulates only encoded vector entries, which modifies both the data and the index. In contrast, current solutions must manipulate separately the data entity and the index built over this data entity.

Because the dimensions of an encoded vector are well defined, the system can process large vectors in parallel (multithreaded processing). The encoded vector set and individual encoded vectors therein can be easily divided into many parts, each processed by a separate thread.

The generic document model tree, the symbol conversion module and the encoded vector set can be easily accessed through programming interfaces such as XPath (XML Path language) and XQuery (XML Query language) (XML Path language). The generic document model tree is used to navigate the hierarchy and the encoded vector set is used to evaluate search conditions. The encoded vectors can be easily merged to produce search results for even very complex search predicates (e.g., predicate ANDing and ORing).

This combination of the efficient data storage and management with implicit indexing represents an improvement over conventional methods and systems of the type described by way of background above.

Exemplary Embodiment

Figure 1:
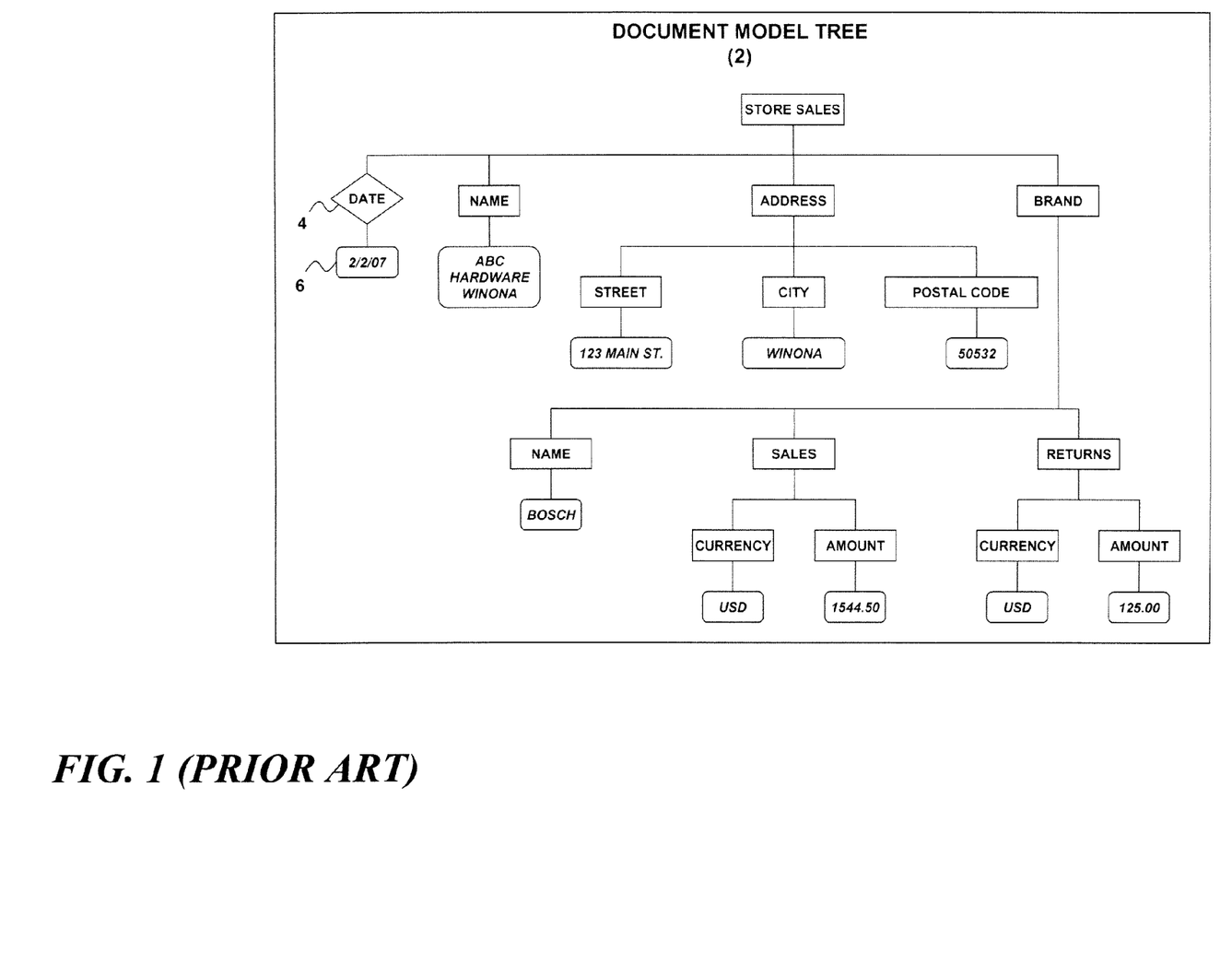
FIG. 1 is a tree diagram representation of a conventional structured document showing exemplary nodes therein.

Turning now to the drawing figures, wherein like reference numerals indicate like elements in all of the several views, FIG. 1 illustrates a conventional document model tree 2 for a structured document pertaining to sales made by an exemplary retail chain enterprise. For ease of description, it will be assumed that the structured document defined by the document model tree 2 is an XML document. However, the structured document could be based on other languages, including a general purpose meta language such as SGML (Standard Generalized Markup Language), or a specialized markup language such as HTML (HyperText Markup Language).

The document model tree 2 represents the hierarchy of an exemplary XML document containing store sales data. A large enterprise with many stores might maintain a large number of such sales data documents, which could be generated for each sale. These documents will normally have a structure described by a suitable schema format, such as XSD (XML Schema Definition) or DTD (Document Type Definition), and will be well formed (i.e., conforming to applicable XML syntax rules). Within the document model tree 2 are a set of nodes arranged in an ordered tree hierarchy. For example, the node 4 is a node (an attribute node) that contains a value (data) "Feb. 21, 2007" shown by reference numeral 6. Other node types include element nodes that contain text nodes. In all, there are a total of ten nodes (1 attribute node, and 9 element nodes) that contain data. The attribute node is labeled "Date," and the element nodes contain text nodes that are respectively labeled "Name," "Street," "City," "Postal Code," (Brand) "Name," (Sales) "Currency," (Sales) "Amount," (Returns) "Currency," and (Returns) "Amount." The exemplary sales information represented by the ten nodes should be self-explanatory. There are also ten values respectively corresponding to the ten nodes. These values (which are shown in the boxes with rounded corners and italicized text) represent sales data that is specific to a particular document.

Within an enterprise, there may be many documents that conform to a given XSD or DTD represented in the document model tree 2, each having its own unique set of values associated with the attribute or text nodes, with some values, such as "Date," "Name," etc., possibly being shared with other documents (e.g., for other sales made on the same date or by the same store). Note that some of the documents that conform to the document model tree 2 may lack one or more of the nodes, or they may have null values associated therewith. For example, for stores having a "no return" policy, the element node labeled "Returns" and all of its children nodes may be absent from those stores' structured documents. In a conventional structured document storage system, the document model tree 2 for each document may be embodied as a tree data structure whose elements may include all of the document nodes shown in FIG. 1. Searching such documents can be handled by existing structured document search tools that navigate the document nodes using a conventional search language such as XPath and XQuery.

Figure 2:
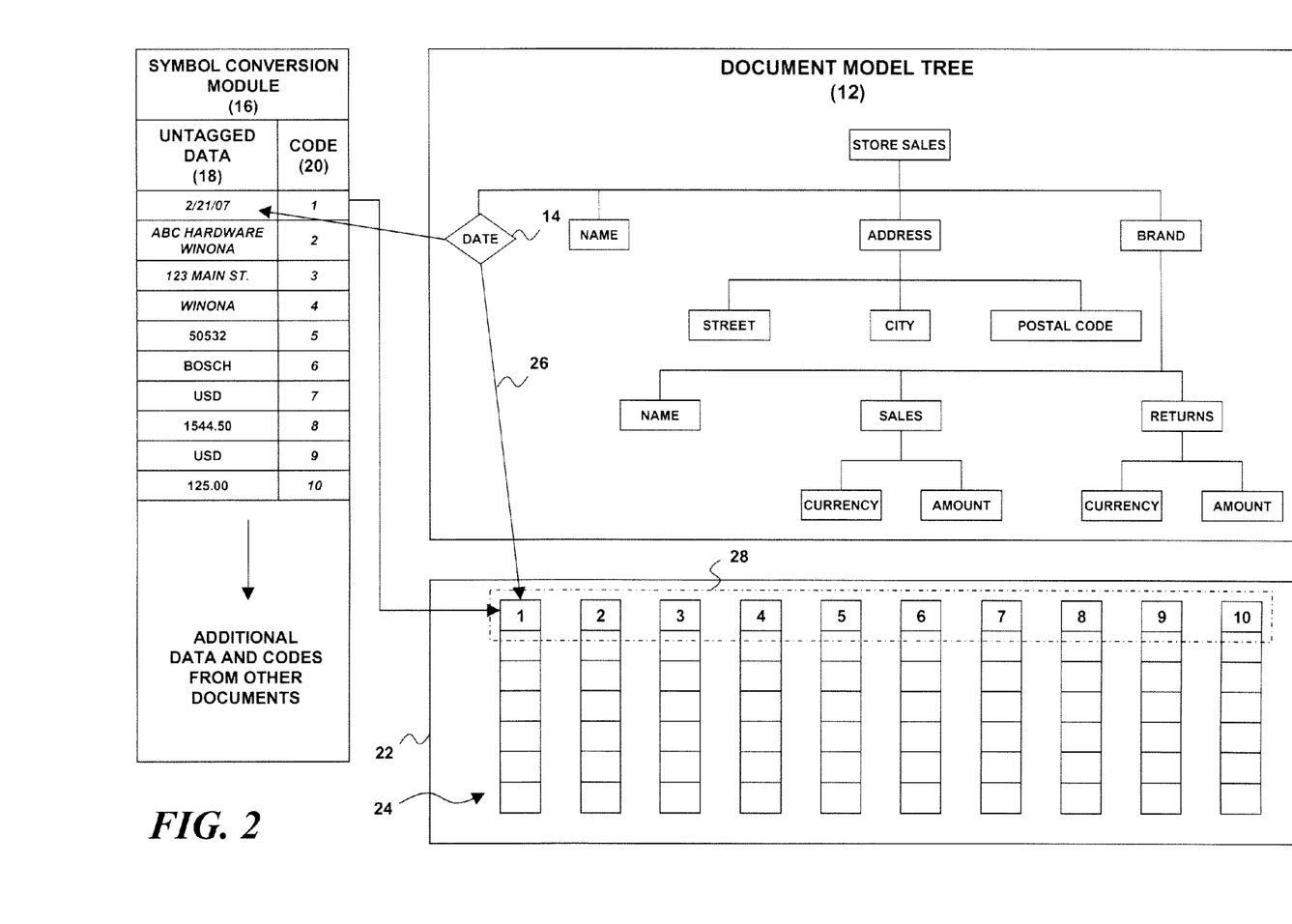
FIG. 2 is a functional block diagram showing an exemplary generic document model tree, an exemplary symbol conversion module and an exemplary encoded vector set.

Turning now to FIG. 2, a generic document model tree 12 is shown that may be constructed according to the teachings of the present disclosure to facilitate improved structured document storage, management, and indexing. The generic document model tree 12 conforms to the structure of the conventional document model tree 2 of FIG. 1, and may likewise be embodied as a tree data structure whose elements include all of the nodes of a particular type of structured document. However, unlike the document model tree 2, the generic document model tree 12 lacks attribute values and text node values. Thus, there is a "Date" attribute node 14 but there is no corresponding attribute value, such as the value "Feb. 21, 2007" shown by reference numeral 6 in FIG. 1. In other words, the generic document model tree 12 does not contain data. Instead, all data, such as the value "Feb. 21, 2007" associated with the "Date" attribute node 14, is maintained as untagged data in a storage entity 16 that will be referred to herein as a symbol conversion module. The symbol conversion module 16 is a data entity that may be embodied as a table, a tree, or other suitable structure, or it may be divided into plural instances of any of the foregoing data entities to facilitate searching (see below) and/or data storage and maintenance. It maintains a set of untagged data 18 for all structured documents that conform to the generic document model tree 12. The symbol conversion module 16 also maintains a set of unique code symbols 20 (e.g., binary number values), each of which is associated with one of the unique untagged data values 18. The symbol conversion module thus converts the textual data contained in each original document to unique value codes. In FIG. 2, there are ten untagged data values 18 corresponding to the ten node values of the document model tree 2 of FIG. 1. There are also ten value codes that respectively correspond to the untagged data values. As conveyed by the notation at the bottom of the symbol conversion module 16, additional untagged data values from other documents that conform to the generic document model tree 12 are also stored in the symbol conversion module 16, along with their corresponding value codes. Note that untagged data values that are shared among several documents need not be repeated in the symbol conversion module 16. The symbol conversion module 16 only needs to maintain one occurrence of each unique untagged data value, thus reducing document storage requirements. Thus, if the store named ABC Hardware Winona made multiple sales on the date Feb. 21, 2007, the symbol conversion module 16 only needs to maintain one entry for these values, namely, the "Name" element value "ABC Hardware Winona" and the "Date" attribute value "Feb. 21, 2007."

The value codes of the symbol conversion module 16 are also stored in an encoded vector set 22 containing individual encoded vectors that each respectively correspond to one of the nodes of the generic document model 12. An encoded vector may be provided for each data-containing node in the generic document model 12. Thus, the encoded vector 24 corresponds to the "Date" node 14, and so on. Because there are ten data containing nodes in the generic document model tree 12, there are ten encoded vectors in the encoded vector set 22 of FIG. 2. Generic document model trees for other documents may have more or fewer encoded vectors, depending on the number data containing nodes. The relationship between the data containing nodes of the generic document model tree 12 and the encoded vectors of the encoded vector set 22 may be established through bidirectional links, such as the link 26, or in any other suitable fashion. The encoded vector set 22 may be embodied in any suitable fashion, including as a table, an array, a set of linked lists, a tree data structure, etc., or it may be divided into plural instances of any of the foregoing data entities to facilitate searching (see below) and/or data storage and maintenance.

Advantageously, the encoded vector set 22 provides an indexing system for all structured documents that correspond to the generic document model tree 12 of FIG. 2. Each index position of an encoded vector stores value code (representing a unique value) for one attribute or text node of a single structured document. The same index position in all of the encoded vectors of the encoded vector set 22 contains the value codes (each representing a unique value) for all of the attribute or text nodes of a single structured document. By way of example only, the first entry of the first encoded vector 24 stores the value code "1." This value code corresponds to the "Date" value "Feb. 21, 2007." The first index position of the remaining encoded vectors of the encoded vector set 22 stores the remaining value codes 2 through 10 for the same structured document. As described above, the corresponding values (untagged data) are stored in the symbol conversion module 16. Because there are seven index positions (this number is chosen for purposes of example only) in each encoded vector of the encoded vector set 22, the encoded vector set of FIG. 2 contains the value codes for seven structured documents corresponding to the generic document model tree 12. The encoded vector set 22 thus implicitly represents a search index for all of such structured documents, with each document being identified by its index position in any given encoded vector.

Each node represented in the generic document model tree 12 that can contain data (attribute or text nodes) has an encoded vector associated with it. The wrapper nodes (nodes that contain no data) have no encoded vectors associated with them. So for every data entity stored in the original document, there is a value code stored in a corresponding encoded vector of the encoded vector set 22. This guarantees that the encoded vector set 22 represents all data entities contained in the original documents.

Reference numeral 28 of FIG. 2 shows the collection of all value codes at the first index position of the encoded vectors in the encoded vector set 22. These value codes have the values shown in the symbol conversion module 16. These values represent the particular structured document that is identified by the document model tree 2 of FIG. 1. Assuming the encoded vectors are built starting from the first index position, this position will logically represent the first structured document that was stored (in the symbol conversion module 16) and indexed (in the encoded vector set 22). The value codes for the data entities stored in the second document processed by the system could then be stored in the second index position of the vectors, and so on. Thus, as stated, the encoded vector set 22 by its nature constitutes an index built over the data entities contained in multiple structured documents. The discussion that follows shows how this indexing can be used for efficient document storage, management and searching.

Figure 3:
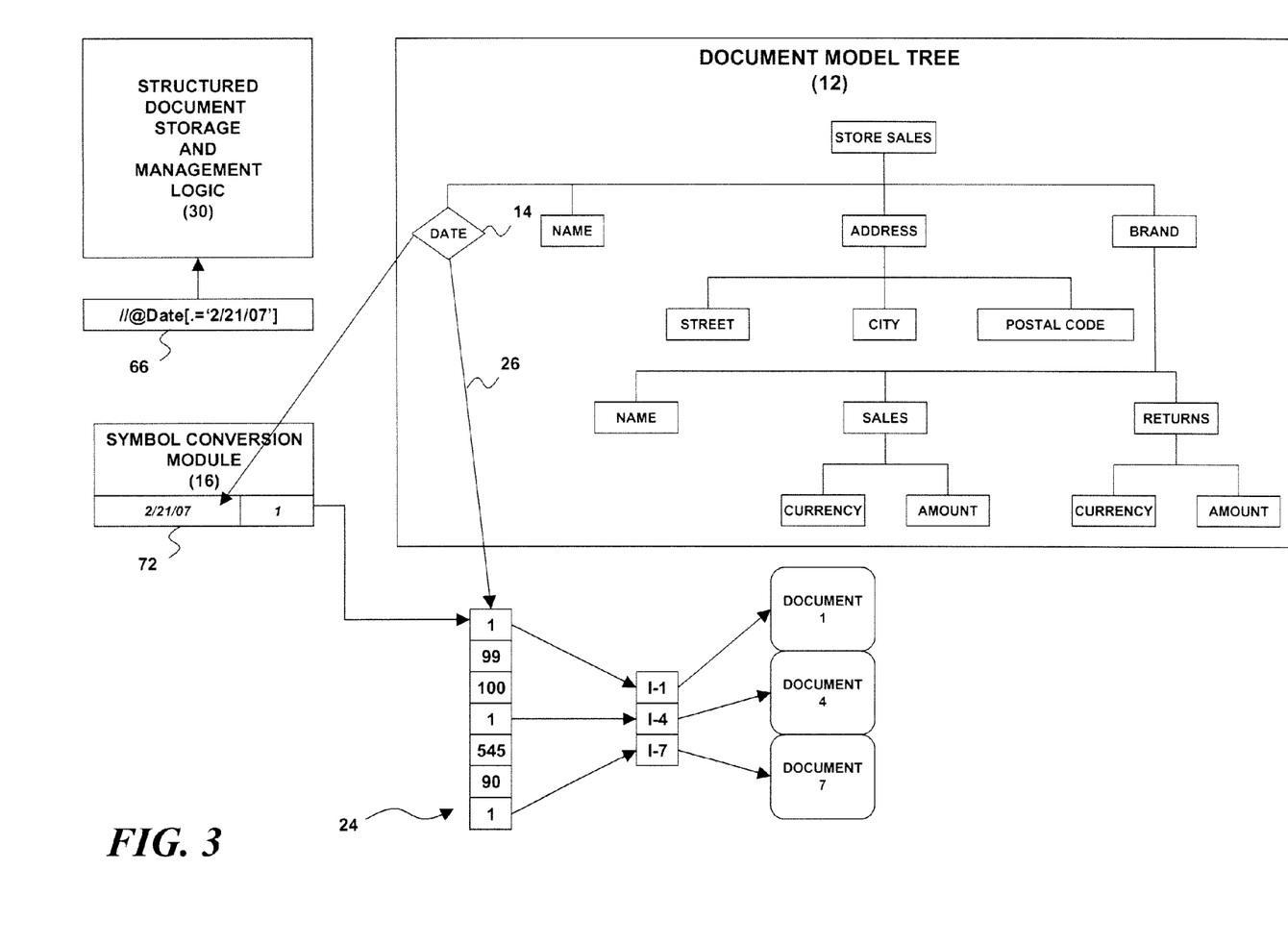
FIG. 3 is a functional block diagram showing an exemplary search operation using the data entities shown in FIG. 2.

Turning now to FIG. 3, management of the generic document model tree 12, the symbol conversion module 16 and the encoded vector set 22 may be handled by structured document storage management logic 30. The storage management logic 30 may be implemented using software, hardware, firmware or any combination of the foregoing. By way of example only, and not by way of limitation, the storage management logic 30 could be implemented on a data processing system such as that described in more detail below in connection with FIG. 9. Functions that may be supported by the storage management logic 30 include (1) maintaining the integrity of the generic document model tree 12, the symbol conversion module 16 and the encoded vector set 22, (2) updating the state of the foregoing data entities when structured documents conforming to the generic document model tree 12 are added, deleted or edited, and (3) document searching. Although not shown in FIG. 3, a suitable interface adapted to receive manual command inputs or to function as an application program interface (API) is provided to the storage management logic 30.

The maintenance function of the storage management logic 30 requires the ability to generate and maintain the generic document model tree 12, the symbol conversion module 16 and the encoded vector set 22. The maintenance function further requires that proper linking be established and maintained between the nodes of the generic document model tree 12 and the encoded vectors of the encoded vector set 22. This includes the bidirectional link 26 between the "Date" attribute node 14 and the encoded vector 24, together with similar links between the other attribute or text nodes and the other encoded vectors.

The updating function of the storage management logic 30 requires that entries in the symbol conversion module 16 and the encoded vector set 22 be added, removed or altered depending on whether structured documents conforming to the generic document model tree 12 are being created, deleted or edited. The updating function will now be described using the flow diagrams of FIGS. 4, 5 and 6.

Figure 4:
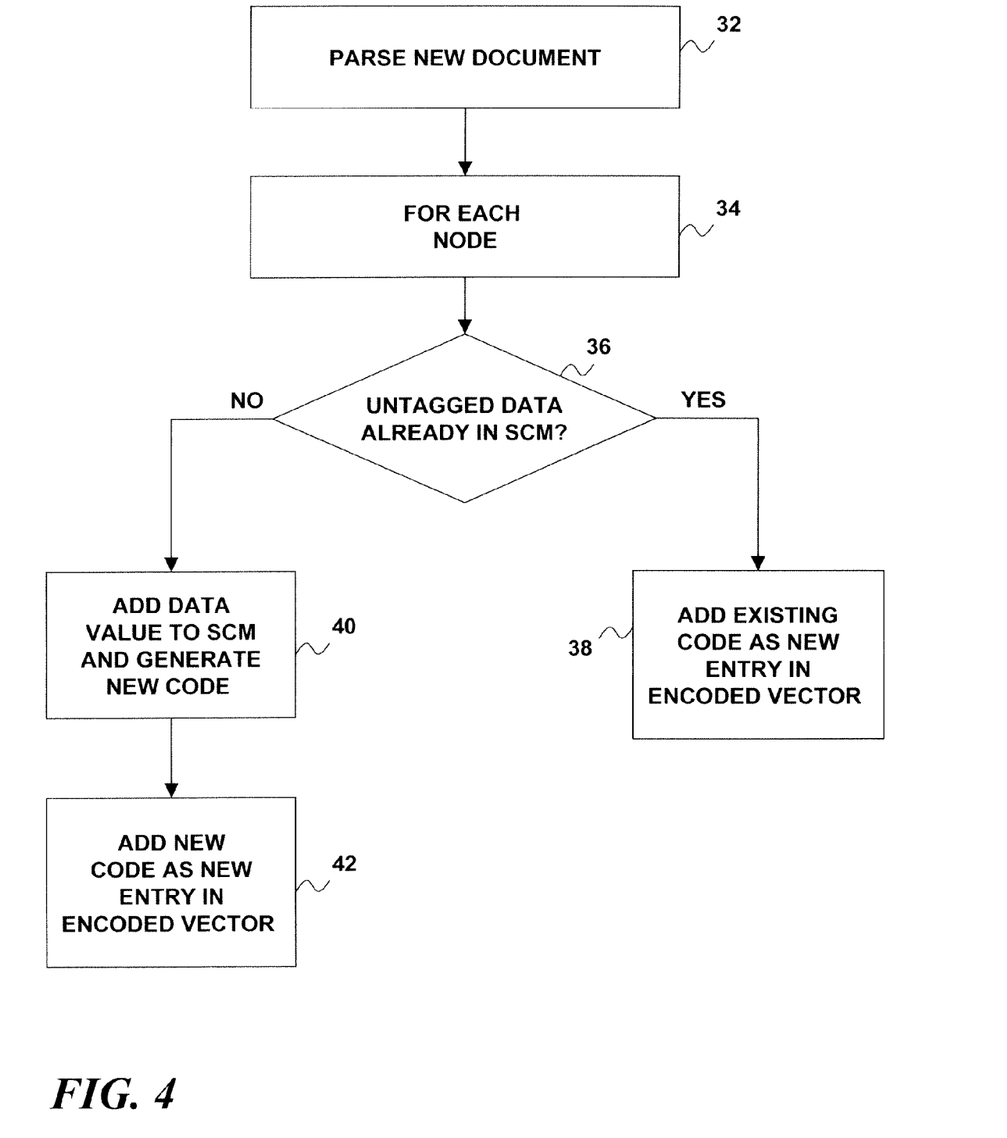
FIG. 4 is a flow diagram illustrating exemplary processing that may be performed by data storage management logic during a document addition operation.

FIG. 4 illustrates exemplary processing that may be performed by the storage management logic 30 during a document addition operation. In step 32, the new document is parsed and all of the nodes and their associated data are identified. In step 34, the storage management logic 30 iterates on each node and in step 36 checks whether or not the node's value already exists in the symbol conversion module 16 (referred to in FIG. 4 as the SCM). If the value already exists in the symbol conversion module 16, then in step 38 the existing value code for this value is identified and the code is added as a new vector entry in the encoded vector linked to the node currently being processed. If the value does not already exist in the symbol conversion module 16, then in step 40 new value and value code entries are added to the symbol conversion module. In step 42, the new value code is added as a new vector entry in the encoded vector linked to the node currently being processed. If there are any nodes of the generic document model tree 12 that do not exist in a given document, the corresponding encoded vector entry for that document can be set to null.

Figure 5:
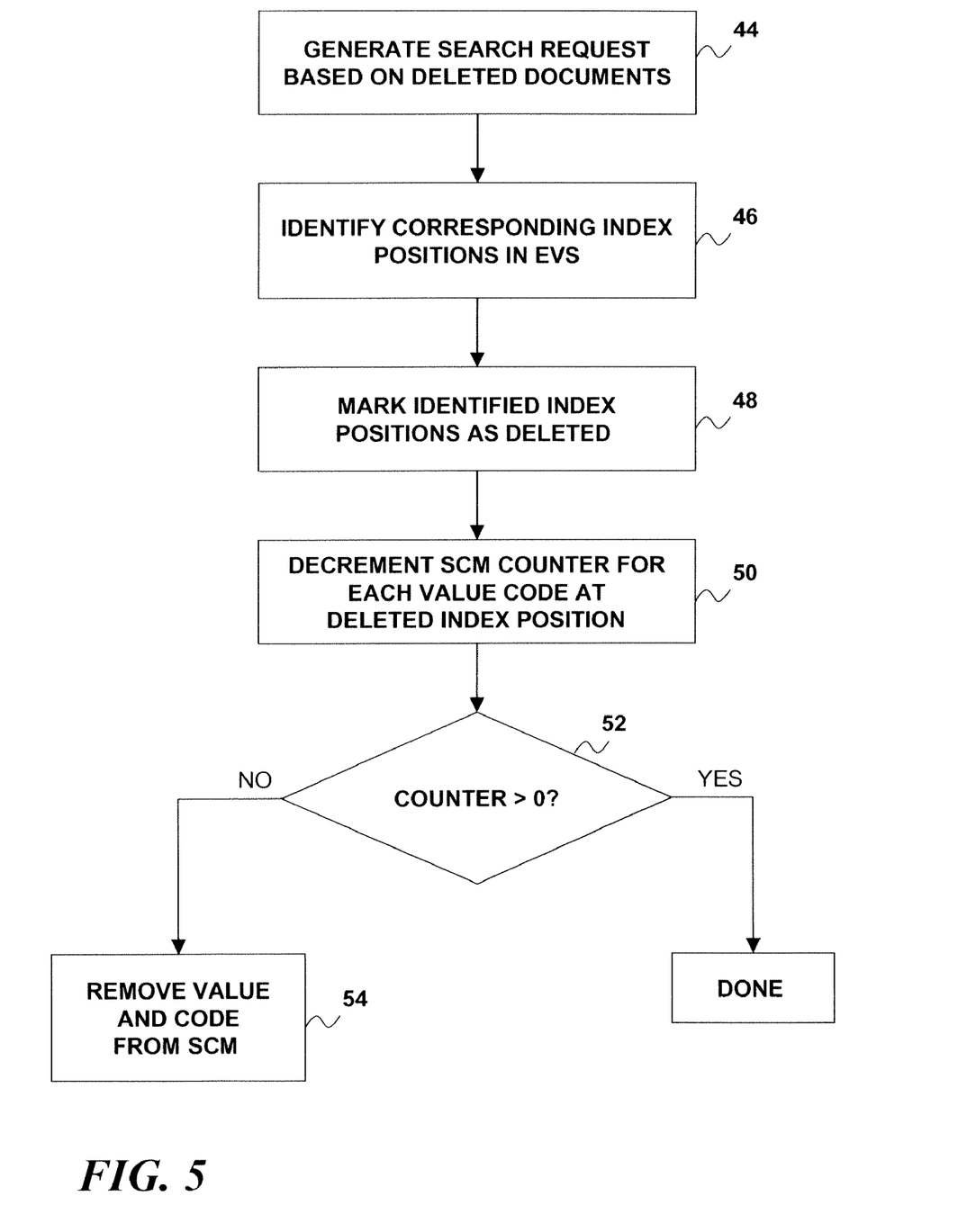
FIG. 5 is a flow diagram illustrating exemplary processing that may be performed by storage management logic during a document removal operation.

FIG. 5 illustrates exemplary processing that may be performed by the storage management logic 30 during a document removal operation. In step 44, the storage management logic 30 may use a conventional search language such as XQuery, or Xpath to generate a search to locate the documents to be deleted. In step 46 the search is executed to produce a list of index positions in the encoded vector set 22 that correspond to the documents to be removed. In step 48, all encoded vector entries at the index position(s) can be marked deleted (for example by setting the code to a designated value −1). The remaining steps 50-54 may be optionally performed to clean up the symbol conversion table 16 by removing unused untagged data entries. For example, the symbol conversion module 16 may contain a counter that represents the number of occurrences of a given value code in the encoded vector set. In step 50, the symbol conversion 16 is checked for each value code associated with a deleted document and for each deleted occurrence the counter is decreased by 1. If, after the update, the counter is found to be greater than 0 in step 52, no further action needs to be taken and the processing is done. If the counter is 0, step 54 can be performed to remove the code and its corresponding untagged data from the symbol conversion module 16. Another technique that would not require counters in the symbol conversion module 16 would have the storage management logic 30 iterate on each encoded vector to check for additional occurrences of each value code being deleted. The absence of such additional occurrences for a given value code would signify that the corresponding entry in the symbol conversion module 16 could be removed.

Figure 6:
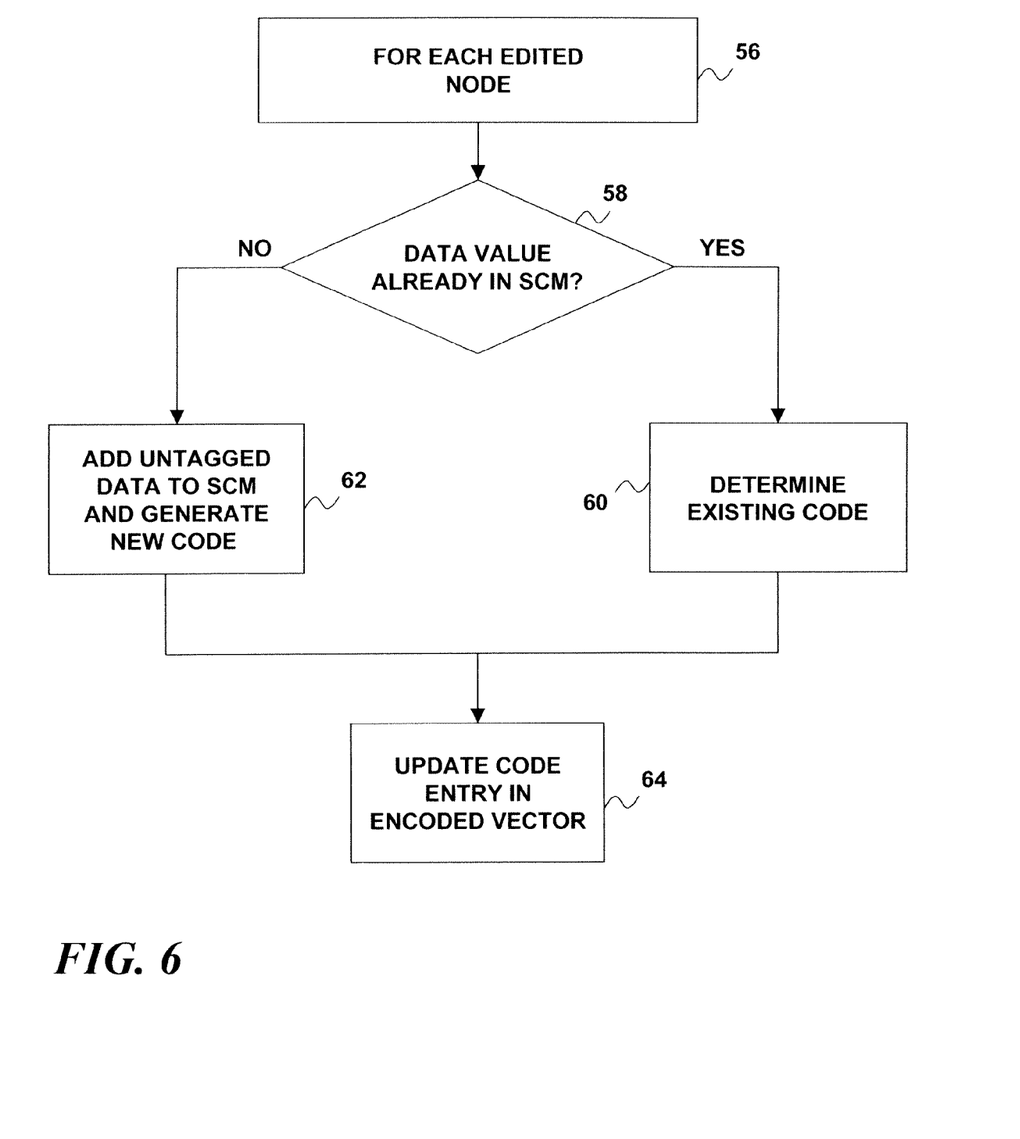
FIG. 6 is a flow diagram illustrating exemplary processing that may be performed by storage management logic during a document editing operation.

FIG. 6 illustrates exemplary processing that may be performed by the storage management logic 30 during the editing of a single document. In step 56, the storage management logic iterates on each edited node of the document and in step 58 checks whether or not the node's new data value already exists in the symbol conversion module 16 (referred to in FIG. 6 as the SCM). If the data value already exists in the symbol conversion module 16, then in step 60 the existing value code for this data value is identified. If the data value does not already exist in the symbol conversion module 16, then in step 62 new untagged data and value code entries are added to the symbol conversion module. In step 64, the value code for the corresponding entry in one of the encoded vectors is edited to become the value code determined in steps 60 or 62. If it is desired to make an edit that applies to multiple documents, the encoded vector for the edited node can be used to locate the encoded vector index positions having the value code for the edited value before the update. This effectively identifies all of the documents requiring the update. Using steps 56-64 of FIG. 6, the value codes at these encoded vector index positions are set to the new (after update) code. Steps 50-54 of FIG. 5 may be used to clean up the symbol conversion module 16 if a document edit resulted in a previous attribute value becoming unused.

Figure 7:
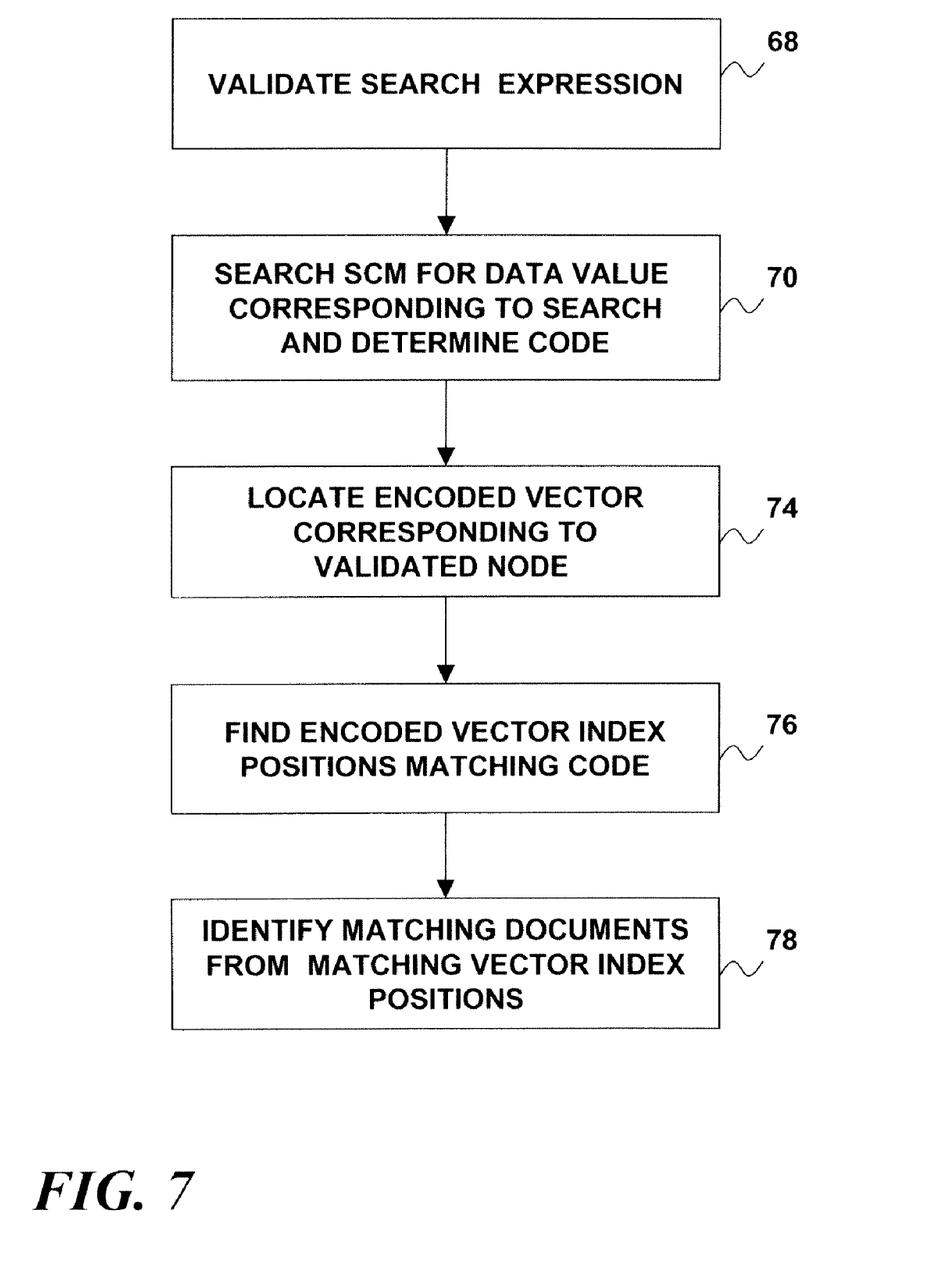
FIG. 7 is flow diagram illustrating exemplary processing that may be performed by storage management logic in response to a document search request.

The search function of the storage management logic 30 will now be described using FIG. 3 and the flow diagram of FIG. 7, which both illustrate exemplary processing that may be performed by the storage management logic in response to a document search request. As shown in FIG. 3, a structured document search may be defined using an Xpath expression, such as the exemplary expression shown by reference numeral 66 to find all documents for the sales that occurred on a particular date, namely, Feb. 21, 2007. In step 68 of FIG. 7, the storage management logic 30 navigates the generic document model tree 12 to validate the search expression. Once the "Date" node 14 is identified as corresponding to the "date" search term, then in step 70 the storage management logic 30 searches the symbol conversion module 16 (referred to in FIG. 7 as the SCM) to locate the untagged data entry whose value is "Feb. 21 2007" and determine the value code for this entry. This entry in the symbol conversion module 16 is shown by reference numeral 72 in FIG. 3. By way of example only, the value code for the attribute value "Feb. 21, 2007" is shown as being "1." In step 74, the storage management logic 30 traverses the link 26 to find the encoded vector 24 that is associated with the "Date" node 14. In step 76, the storage management logic 30 scans the encoded vector 24 to find all index positions having the identified value code (i.e., "1" in the present example). The matching documents are found in step 78. As previously discussed, the index positions within the encoded vector 24 having the matching value code indicate the logical document numbers that contain this data entity. By way of example only, FIG. 3 shows that index positions I-1, 1-4 and I-7 of the encoded vector 24 contain the matching value code of "1." This means that logical document numbers 1, 4 and 7 are responsive to the search request.

Figure 8:
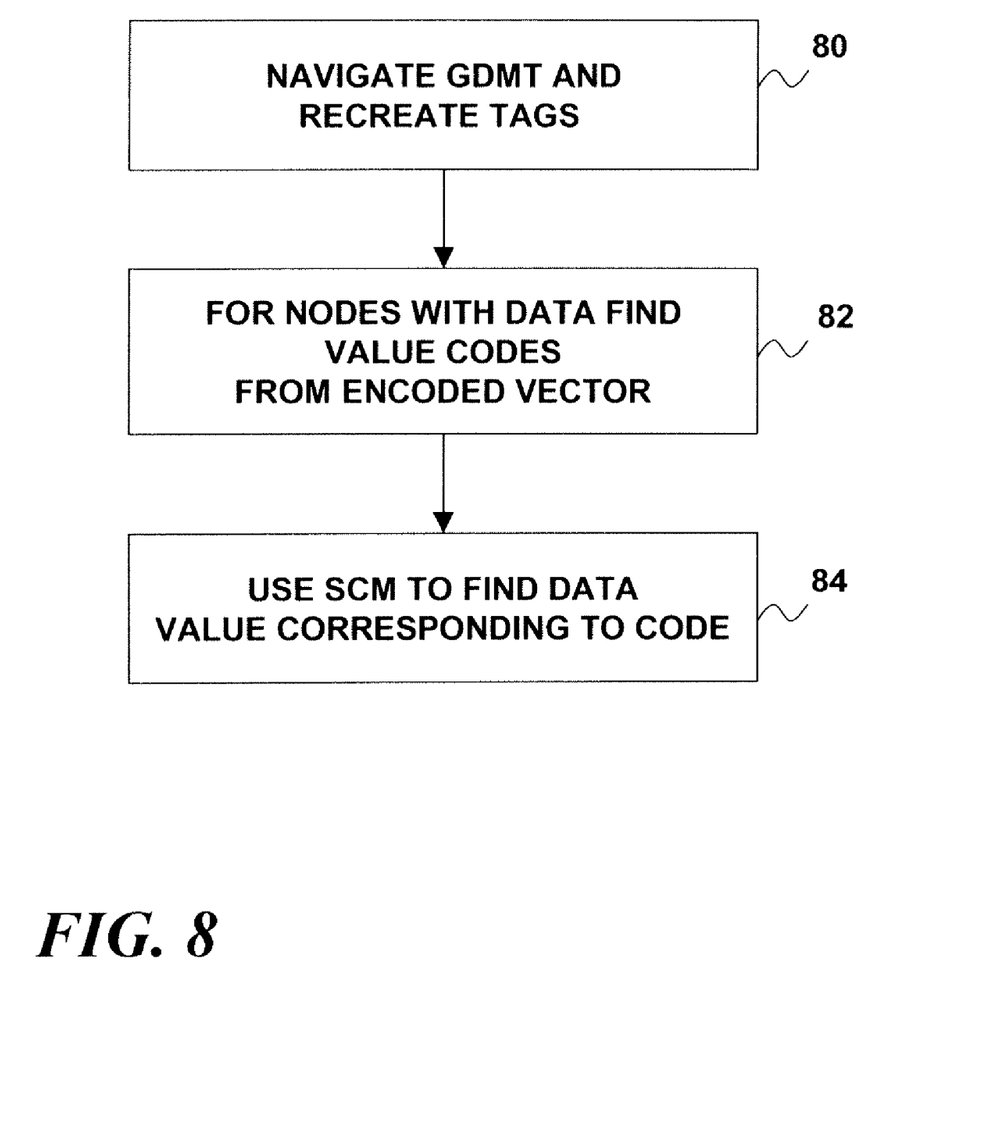
FIG. 8 is a flow diagram illustrating exemplary processing that may be performed by storage management logic for reassembling an original document.

On occasion, the storage management logic 30 may be requested to retrieve an entire original document. Exemplary processing for reassembling the original document is shown in FIG. 8. In step 80, the storage management logic 30 navigates the generic document model tree 12 (referred to in FIG. 8 as the GDMT), visiting the nodes in the document order and recreating the tags. For those nodes that contain data, the storage management logic 30 retrieves the value code in step 82 from the associated encoded vector in the encoded vector set 22, then in step 84 uses the symbol conversion module 16 (referred to in FIG. 8 as the SCM) to produce the original textual value. Nodes with no data require no further action.

Figure 9:
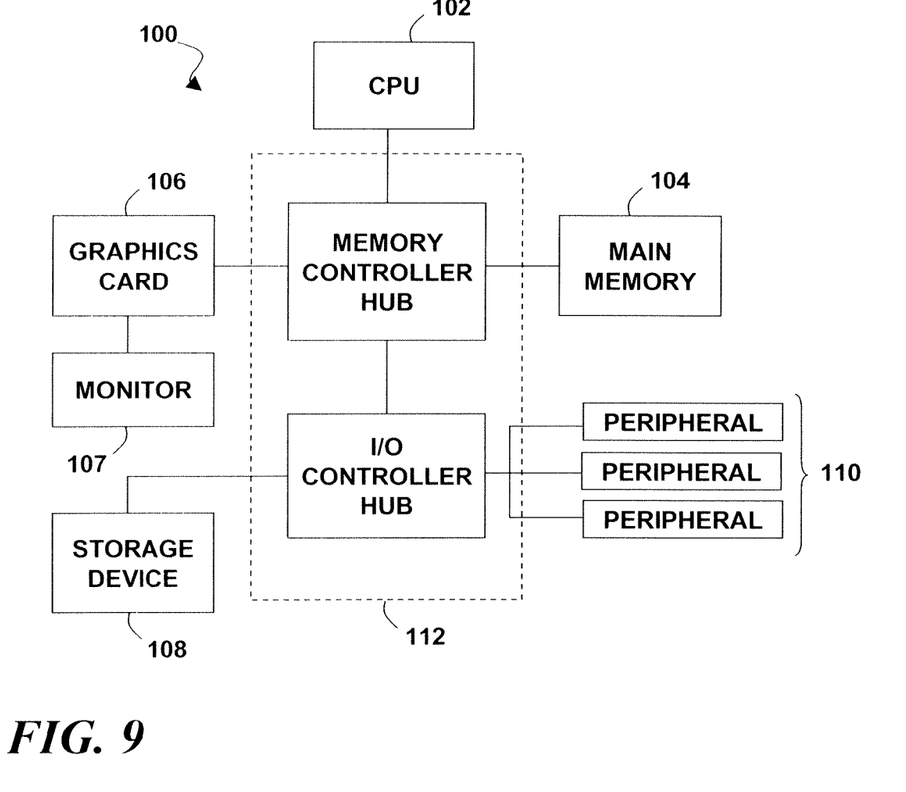
FIG. 9 is a functional block diagram showing an exemplary data processing system that may be used to implement data storage and management as disclosed herein.

Accordingly, a technique for the storage, management and automatic indexing of structured documents has been disclosed. It will be appreciated that the foregoing concepts may be variously embodied in any of a data processing system, a machine implemented method, and a computer program product in which programming logic is provided by one or more machine-useable media for use in controlling a data processing system to perform the required functions. Relative to a data processing system and machine implemented method, FIG. 9 illustrates an exemplary hardware environment 100 that may be used to implement the storage management logic 30, together with the generic document model tree 12, the symbol conversion module 16 and the encoded vector set 22. The hardware environment 100 may be implemented as a server or a client. It may include one or more CPUs or other data processing resources 102 (data processor) and a main memory 104 that collectively provide a data processing core, an optional graphics card 106 for generating visual output information to an optional display monitor 107, a peripheral storage device 108, other peripheral devices 110, and a bus infrastructure 112 interconnecting the foregoing elements. If the storage management logic 30 is implemented in software, the logic may be loaded in the main memory 104. All or portions of the generic document model tree 12, the symbol conversion module 16 and the encoded vector set 22 may also be loaded in the main memory 104. Various I/O (Input/Output) resources may be provided by the peripheral devices 110, which may include a USB bus controller, a SCSI disk controller, and a NIC. The optional monitor 107 may be implemented as part of a user interface. One or more storage devices (not shown) may be attached to the SCSI disk controller to provide persistent storage for the generic document model tree 12, the symbol conversion module 16 and the encoded vector set 22. Alternatively, these entities could be maintained by a database management system (not shown).

Figure 10:
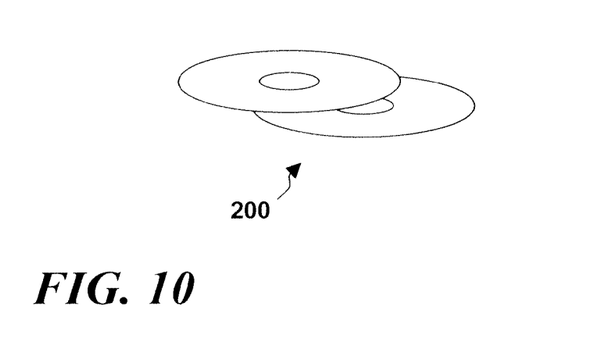
FIG. 10 is a diagrammatic representation of exemplary storage media that may be used in a computer program product implementation of software and/or firmware logic for data storage and management as disclosed herein.

Relative to a computer program product having a machine-readable media and programming logic, exemplary data storage media for storing the programming logic are shown by reference numeral 200 in FIG. 10. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the destination data processing system 4, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal carrying medium (such as a network), or other entity that can contain, store, communicate, propagate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A structured document storage and management system, comprising:
   a data store having one or more computer useable storage media;
   a generic document model tree in said data store representing a structured document model, said generic document model tree containing one or more structured document nodes without storing node data that is unique to any particular structured document;
   a symbol conversion module in said data store containing untagged data associated with said one or more structured document nodes, said untagged data representing node data for one or more particular structured documents conforming to said structured document model, said symbol conversion module also maintaining a value code in association with each element of said node data; and
   an encoded vector set in said data store comprising a set of encoded vectors, each encoded vector being assigned to one of said structured document nodes of said generic document model tree, each encoded vector being comprised of a set of vector elements that each store a copy of one of said symbol conversion module value codes for said structured document node to which said encoded vector is assigned, each value code being stored at an index position in said encoded vector that corresponds to a particular structured document that conforms to said generic document model tree;
   whereby said encoded vector set represents encoded document storage for a set of structured documents that conform to said generic document model tree, with said node data for each node of a structured document being determinable by consulting each of said encoded vectors at an index position corresponding to said structured document and using said value code stored at said index position to consult said symbol conversion module and identify said node data that is associated with said value code.

2. The system of claim 1, wherein each of said one or more structured document nodes having associated untagged data are linked to a corresponding one of said encoded vectors.

3. The system of claim 1, further comprising maintenance logic adapted to maintain said generic document module tree, said symbol conversion module and said encoded vector set.

4. The system of claim 1, further comprising update logic adapted to handle document additions, document deletions, and document edits.

5. The system of claim 1, further comprising search logic adapted to handle search requests for documents whose structure is defined by said generic document object model tree.

6. The system of claim 1, further comprising document retrieval logic adapted to recreate an entire structured document using said generic document model tree, said encoded vector set and said symbol conversion module.

7. A structured document storage and management method, comprising:
- establishing the following in a data store having one or more computer useable storage media:
- a generic document model tree representing a structured document model, said generic document model tree containing one or more structured document nodes without storing node data that is unique to any particular structured document;
- a symbol conversion module containing untagged data associated with said one or more structured document nodes, said untagged data representing node data for one or more structured documents conforming to said structured document model, said symbol conversion module also maintaining a value code in association with each element of said node data; and
- an encoded vector set comprising a set of encoded vectors, each encoded vector being assigned to one of said structured document nodes of said generic document model tree, each encoded vector being comprised of a set of vector elements that each store a copy of one of said symbol conversion module value codes for said structured document node to which said encoded vector is assigned, each value code being stored at an index position in said encoded vector that corresponds to a particular structured document that conforms to said generic document model tree;
- whereby said encoded vector set represents encoded document storage for a set of structured documents that conform to said generic document model tree, with said node data for each node of a structured document being determinable by consulting each of said encoded vectors at an index position corresponding to said structured document and using said value code stored at said index position to consult said symbol conversion module and identify said node data that is associated with said value code.

8. The method of claim 7, wherein each of said one or more structured document nodes having associated untagged data are linked to a corresponding one of said encoded vectors.

9. The method of claim 7, further comprising maintaining said generic document module tree, said symbol conversion module and said encoded vector set.

10. The method of claim 7, further comprising updating a structured document in response to requests for document additions, document deletions, and document edits.

11. The method of claim 7, further comprising searching for documents whose structure is defined by said generic document object model tree.

12. The method of claim 7, further comprising recreating an entire structured document using said generic document model tree, said encoded vector set and said symbol conversion module.

13. A computer program product, comprising:
- one or more computer useable storage media;
- program logic stored on said computer useable storage media for programming a data processing platform to implement structured document storage and management, as by:
- establishing a generic document model tree representing a structured document model, said generic document model tree containing one or more structured document nodes without storing node data that is unique to any particular structured document;
- establishing a symbol conversion module containing untagged data associated with said one or more structured document nodes, said untagged data representing node data for one or more particular structured documents conforming to said structured document model, said symbol conversion module also maintaining a value code in association with each element of node data; and
- establishing an encoded vector set comprising a set of encoded vectors, each encoded vector being assigned to one of said structured document nodes of said generic document model tree, each encoded vector being comprised of a set of vector elements that each store a copy of one of said symbol conversion module value codes for said structured document node to which said encoded vector is assigned, each value code being stored at an index position in said encoded vector that corresponds to a particular structured document that conforms to said generic document model tree;
- whereby said encoded vector set represents encoded document storage for a set of structured documents that conform to said generic document model tree, with said node data for each node of a structured document being determinable by consulting each of said encoded vectors at an index position corresponding to said structured document and using said value code stored at said index position to consult said symbol conversion module and identify said node data that is associated with said value code.

14. The computer program product of claim 13, wherein each of said one or more structured document nodes having associated untagged data are linked to a corresponding one of said encoded vectors.

15. The computer program product of claim 13, wherein said data processing platform is further programmed to maintain said generic document module tree, said symbol conversion module and said encoded vector set.

16. The computer program product of claim 13, wherein said data processing platform is further programmed to update a structured document in response to requests for document additions, document deletions, and document edits.

17. The computer program product of claim 13, wherein said data processing platform is further programmed to search for documents whose structure is defined by said generic document object model tree.

18. The computer program product of claim 13, wherein said data processing platform is further programmed to recreate an entire structured document using said generic document model tree, said encoded vector set and said symbol conversion module.

19. A computer program product, comprising:
- one or more computer useable storage media;

program logic stored on said computer useable storage media for programming a data processing platform to implement structured document storage and management, as by:

establishing a generic document model tree representing a structured document model, said generic document model tree containing one or more structured document nodes without storing node data that is unique to any particular structured document;

establishing a symbol conversion module containing untagged data associated with said one or more structured document nodes, said untagged data representing node data for one or more particular structured documents conforming to said structured document model, said symbol conversion module also maintaining a value code in association with each element of said node data;

establishing an encoded vector set comprising a set of encoded vectors, each encoded vector being assigned to one of said structured document nodes of said generic document model tree, each encoded vector being comprised of a set of vector elements that each store a copy of one of said symbol conversion module value codes for said structured document node to which said encoded vector is assigned, each value code being stored at an index position in said encoded vector that corresponds to a particular structured document that conforms to said generic document model tree; and linking said one or more structured document nodes having associated untagged data to a corresponding one of said encoded vectors;

whereby said encoded vector set represents encoded document storage for a set of structured documents that conform to said generic document model tree, with said node data for each node of a structured document being determinable by consulting each of said encoded vectors at an index position corresponding to said structured document and using said value code stored at said index position to consult said symbol conversion module and identify said node data that is associated with said value code.

20. The computer program product of claim 19, wherein said data processing platform is further programmed to:

maintain said generic document module tree, said symbol conversion module and said encoded vector set;

update a structured document in response to requests for document additions, document deletions, and document edits;

search for documents whose structure is defined by said generic document object model tree; and recreate an entire structured document using said generic document model tree, said encoded vector set and said symbol conversion module.

* * * * *